United States Patent
Bregman et al.

(10) Patent No.: US 11,846,970 B2
(45) Date of Patent: Dec. 19, 2023

(54) PERFORMING DATA CORRELATION TO OPTIMIZE CONTINUOUS INTEGRATION ENVIRONMENTS

(71) Applicant: RED HAT, INC., Raleigh, NC (US)

(72) Inventors: Arie Bregman, Gan Yavne (IL); Avraham Talmor, Rishon Letzion (IL); Ilan Gersht, Bat Yam (IL)

(73) Assignee: Red Hat, Inc., Raleigh, NC (US)

( * ) Notice: Subject to any disclaimer, the term of this patent is extended or adjusted under 35 U.S.C. 154(b) by 32 days.

(21) Appl. No.: 17/556,313

(22) Filed: Dec. 20, 2021

(65) Prior Publication Data
US 2023/0195452 A1 Jun. 22, 2023

(51) Int. Cl.
*G06F 8/71* (2018.01)
*G06F 18/2135* (2023.01)
*G06F 18/23213* (2023.01)

(52) U.S. Cl.
CPC ............ *G06F 8/71* (2013.01); *G06F 18/2135* (2023.01); *G06F 18/23213* (2023.01)

(58) Field of Classification Search
CPC ... G06F 8/71; G06F 18/23213; G06F 18/2135
USPC ........................................................ 717/121
See application file for complete search history.

(56) References Cited

U.S. PATENT DOCUMENTS

| | | | |
|---|---|---|---|
| 9,477,707 B2 | 10/2016 | Chi et al. | |
| 10,120,668 B2 | 11/2018 | Palavalli et al. | |
| 10,353,593 B2 | 7/2019 | Alapati et al. | |
| 10,437,843 B2 | 10/2019 | Nguyen et al. | |
| 10,452,435 B2 | 10/2019 | Novak et al. | |
| 10,452,438 B2 | 10/2019 | Shih et al. | |
| 10,838,846 B1 * | 11/2020 | Saleh-Esa | ........... G06F 11/3604 |
| 10,853,059 B2 | 12/2020 | Mills | |

* cited by examiner

*Primary Examiner* — John Q Chavis
(74) *Attorney, Agent, or Firm* — Lowenstein Sandler LLP

(57) ABSTRACT

The technology disclosed herein enables performing data correlation to optimize continuous integration environments. An example method comprises receiving, by a processor of a client device, input data identifying a plurality of execution environment parameters associated with an execution environment; retrieving, during execution of a software build job, parameter data associated with each of the execution environment parameters of the plurality of execution environment parameters; generating, in view of the retrieved parameter data, correlation data indicative of a relationship between a first execution environment parameter of the plurality of execution environment parameters and a second execution environment parameter of the plurality of execution environment parameters, wherein the first execution environment parameter reflects an observable aspect of a state of the execution environment, and the second execution environment parameter reflects an aspect associated with a performance of the execution environment; and displaying, on a graphical user interface, the correlation data.

20 Claims, 6 Drawing Sheets

```
                                            500
                                           ╱

┌─────────────────────────────────────────────────────────────┐
│ Receiving, by a processing device, input data identifying a │
│    plurality of execution environment parameters            │
│          associated with an execution environment           │
│                           510                               │
└─────────────────────────────────────────────────────────────┘
                              │
                              ▼
┌─────────────────────────────────────────────────────────────┐
│ Retrieving, by the processing device, during execution of a │
│  software build job, parameter data associated with each of │
│    the execution environment parameters of the plurality    │
│              of execution environment parameters            │
│                           520                               │
└─────────────────────────────────────────────────────────────┘
                              │
                              ▼
┌─────────────────────────────────────────────────────────────┐
│ Generating, by the processing device and in view of the     │
│ retrieved parameter data, correlation data indicative of a  │
│ relationship between a first execution environment          │
│ parameter of the plurality of execution environment         │
│ parameters and a second execution environment parameter of  │
│ the plurality of execution environment parameters           │
│                           530                               │
└─────────────────────────────────────────────────────────────┘
                              │
                              ▼
┌─────────────────────────────────────────────────────────────┐
│   Displaying, by the processing device on a graphical user  │
│             interface, the correlation data                 │
│                           540                               │
└─────────────────────────────────────────────────────────────┘
```

FIG. 5

PERFORMING DATA CORRELATION TO OPTIMIZE CONTINUOUS INTEGRATION ENVIRONMENTS

TECHNICAL FIELD

The present disclosure is generally related to build management, and more particularly, to performing data correlation to optimize continuous integration environments.

BACKGROUND

In computer program development, continuous integration is the practice of merging developer working copies of computer program code for an application into a shared mainline code base, generally, several times a day. With continuous integration, each computer program developer team member submits source code for the application being developed on a daily (or more frequent) basis, and a set of operations referred to herein as a build process ("build") is performed to produce executable code from the source code. The executable code may be for an application, for example. The set of operations for providing a build may include compiling source code files to produce the executable code for an application, performing tests on the executable code, and instating or deploying the executable code. The build process may be performed periodically, or with each significant source code change. Isolated source code changes can be tested as part of the build process when the source code is added to the larger mainline code base.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 5 depicts a flow diagram of another example method for performing data correlation, in accordance with one or more aspects of the present disclosure.

Figure 1:
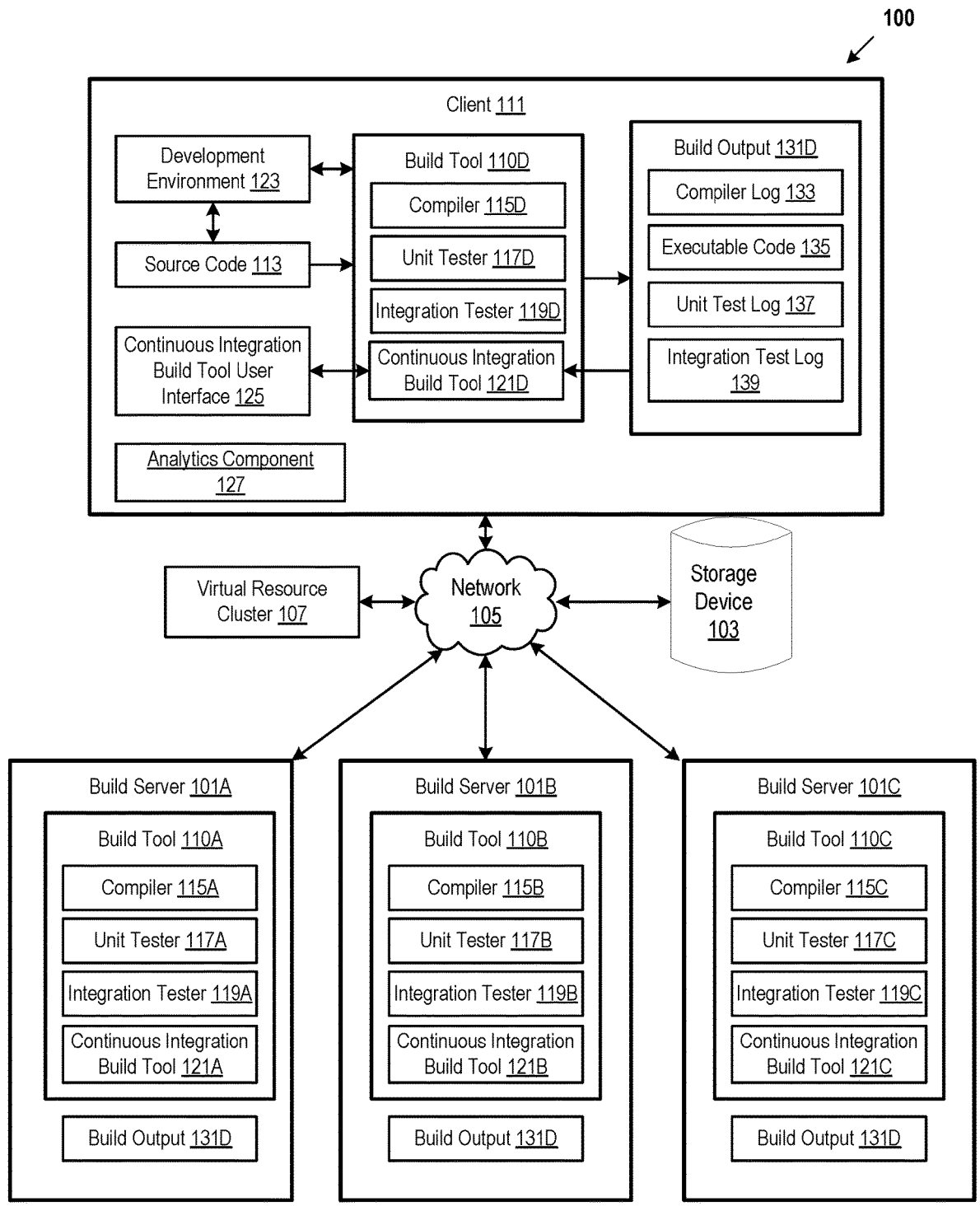
FIG. 1 depicts a high-level block diagram of an example computing environment that includes a provisioning component that schedules jobs for execution on provisioned computing nodes, in accordance with one or more aspects of the present disclosure.

Described herein are systems and methods for performing data correlation to optimize continuous integration environments. Continuous software integration tools, referred to herein as "build tools," may perform build processes to generate software images from source code and other data. Software images may be, for example, executable code of software application programs. Source code may include instructions in a programming language that may be translated to executable code. The translation from source code to executable code may be performed by compiler programs. Other data may also be processed, e.g., transformed to suitable formats, and included in software images. A build process may cause the appropriate source code to be translated to executable code and included in the resulting software images. Instructions specifying how to perform the build process may be provided to the build tools in the form of build files, such as build scripts or declarative descriptions of the files to be built in terms of files from which they are built. A particular set of instructions specifying how to perform a particular build process are referred to herein as a software build "job." A job may be executed, e.g., by a build tool running on a computing node, and the executing job is referred to herein as an "active build." A computing node may be a virtualized or bare metal computer system (e.g., a server) that provides computing resources to execute jobs. A job may include a set of stages, which are may be executed sequentially in an active build. A job may thus be referred to as a "pipeline" of one or more stages. The stages may include, for example, compile, test, and deploy stages. The compile stage may translate source code to executable code, the test stage may perform tests to verify that the executable code operates correctly, and the deploy stage may install the executable code on host machines, for example. A build may execute for a substantial period of time (e.g., several minutes to several hours or days).

Computing nodes may be selected from a pool of available computing nodes and each computing node may include a different set of computing resources. Computing resources may include central processing unit(s) (CPU(s)), memory (e.g., volatile memory such as random access memory (RAM)), non-volatile memory, network bandwidth, etc. A scheduled job may be placed in a first-in, first-out (FIFO) build queue and the next available computing node from the node pool may be assigned to execute the next waiting job. In some instances, a computing node may be unable to execute a job. For example, the computing resources required to execute a job may be unavailable in the computing node. Accordingly, the job may remain in the build queue until a computing node capable of executing the job becomes available.

Prior to, during, and after the execution of the job, the host system and/or the computing node may generate and collect various data regarding different aspects of the execution environment. This data can include job definition properties, job execution information, job artifacts, computing node properties, etc. Job definition properties may include data related to how many stages are in a job (e.g., how many states in the pipeline), a type of job, host data associated with the job, the type of access permission the job is granted, etc. Job execution information may include data related to how long the job waited in the queue before being executed on the computing node, duration of executing the job, results of the execution, such as whether the job executed successfully or failed, etc. Job artifacts may include data related to whether the job published test data, how much time did the performing the test consume, the type of log archived by the computing node, etc. Computing node properties may include data related to the computing nodes in pool of available computing nodes (e.g., the specifications of each computing node, the names of each computing node, the Internet Protocol (IP) and/or Media Access Control (MAC) addresses for each computing node, etc.), which job was executed on which computing node, which entity is responsive for which computing node, etc.

Current systems fail to analyze and correlate the data regarding different properties of the execution environment.

This leads to current systems lacking capabilities to optimize the execution environment based on correlations extracted from this data, which may lead to unnecessary delays in job execution and poor utilization of computing resources. Accordingly, it is desirable to provide the ability to analyze and correlate execution environment related data.

Aspects of the present disclosure address the above-noted and other deficiencies by enhancing a build system with the ability to determine correlations between different parameters of an execution environment and to optimize the execution environment. In some embodiments, the correlation data may be between execution environment parameters and execution environment performance. In an illustrative example, an analytics component of a host system may receive input data (e.g., user input) related to an observable parameter and a target parameter. An observable parameter may reflect any observable aspect of the state of the execution environment. A target parameter may reflect any aspect of the execution environment performance. For example, an observable parameter may reflect a characteristic of a computing resource of the execution environment (e.g., CPU specifications of a computing node, RAM specifications of the computing node, network bandwidth of the computing node, etc.) and a target parameter may include the execution time of a job processed on the computing node. One or more observable parameters and one or more target parameters may be selected to determine their mutual correlation. The determined correlation may then be displayed on a graphical user interface of a client device.

The analytics component may then retrieve data related to the observable parameter and the target parameter. The data may be retrieved by, for example, extracting stored metadata related to the observable parameter and the target parameter, retrieving corresponding log data related to the observable parameter and the target parameter, etc. The data may be retrieved prior to, during, and/or after execution of the jobs on the computing node. The analytics component may then process the retrieved data to generate and display correlation data. In some embodiments, the correlation data may be a direct association between the observable parameter and the target parameter. For example, the correlation data may indicate the duration of each job executed on the computing node with the particular computing resource.

In some embodiments, multiple observable parameters may be selected to determine their correlations with one or more target parameters. In such embodiments, the analytics component may use one or more correlation techniques to determine or display the correlation between one or more observable parameters and one or more target parameters. The correlation techniques may include a correlation matrix, a scatter plot, a correlation algorithm (e.g., k-means clustering, Lasso Regression, etc.), a principal component analysis, or any other technique capable of determining a correlation between sets of data.

In some embodiments, the analytics component may optimize the execution environment in view of the correlation data. Optimizing the execution environment may decrease the queue wait time for processing a job, decrease the execution time of a job by selecting a particular computing node to execute the job, etc. Such optimization may include setting a condition (e.g., conditional statements, conditional expressions, conditional constructs, etc.) in the execution environment, adjusting one or more parameters of the execution environment, etc. The optimizations may be generated using user input. Accordingly, aspects of the present disclosure optimize and improve the resource utilization of build systems, as well as prevent delays in job execution.

Various aspects of the above referenced methods and systems are described in details herein below by way of examples, rather than by way of limitation.

FIG. 1 depicts a high-level block diagram of an example computing environment 100 that includes an analytics component 127, in accordance with one or more aspects of the present disclosure. The computing environment 100 may provide build management services that include executing build operations to perform builds of source code 113 to produce build output 131A-D. The builds may be performed in accordance with instructions provided by the continuous integration build tool user interface 125. The computing environment 100 may include build servers 101A-C for running the sets of operations for providing builds in a continuous integration environment. The builds may be for source code 113, e.g., of an application that is being developed. An application may be, for example, a web application, a desktop application, a browser application, etc. An application may be a messaging application, a video application, a social networking application, video sharing application, photo sharing application, chat application, mobile application of a content provider or any combination of such applications. An application may be a computationally large or data-intensive application, such as a forecasting application, a modeling application, a data analysis application, etc. The build servers 101A-C may be hosted on any type of computing node, which may be a virtualized or bare metal computing device such as a server computer, a desktop computer, a portable computing device such as, and not limited to, netbooks, laptop computers, and the like.

Build tools 110A-D may be located on client 111, on build servers 101A-C, or both. Each build tool 110A-D may execute a set of operations to provide the build of the mainline code. The mainline code may be the base of a project on which development progresses. The set of operations may include compiling the code, testing the code when the code is compiled, testing isolated code when the code is added to the larger mainline code base, and performing continuous build operations e.g., performing a build a periodic intervals or in response to user requests, and presenting information about the status of executing builds and the results of completed builds. A software build job (e.g., a pipeline of one or more stages) can be executed by build tool 110A-D. Client 111 may further include analytics component 127 to perform correlation operations between multiple aspects and/or parameters of the computing environment 100. Analytics component 127 will be explained in greater detail with references to FIG. 2 below.

Users, such as computer program development team members, may use a development environment 123 to submit source code 113 to the build tool 110D located on client 111 and/or to one or more build tools 110A-C located on build servers 101A-C. Users may submit source code to build tools 110A-C located on the build servers 101A-C from client 111 via network 105. Build tool 110A-D or other tool (e.g., a version control tool) may merge the submitted source code 113 with a shared mainline code base that is being stored and maintained by build server 101A-C. Users may submit source code 113 to any of the build tools 110A-D on a daily (or more frequent) basis, and request execution of a build process for the submission.

A client machine 111 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The network 105 may be a private network (e.g., a local area network (LAN), a wide area network (WAN), intranet, or other similar private networks) or a public network (e.g., the Internet).

Storage device 103 may be physical memory and may include volatile memory devices (e.g., random access memory (RAM)), non-volatile memory devices (e.g., flash memory, NVRAM), and/or other types of memory devices. In another example, storage device 103 may include one or more mass storage devices, such as hard drives, solid state drives (SSD)), other data storage devices, or a combination thereof. In yet another example, storage device 103 may be any virtual memory, logical memory, other portion of memory, or a combination thereof for storing, organizing, or accessing data. In a further example, storage device 103 may include a combination of one or more memory devices, one or more mass storage devices, virtual memory, other data storage devices, or a combination thereof, which may or may not be arranged in a cache hierarchy with multiple levels.

Build tool 110A-D may include a compiler 115A-D to compile computer source code 113 into executable code 135, and to generate other build output 131A-D, such as a compiler log 133 that contains output describing progress and results of the compilation process. Build tool 110A-D may include a unit tester 117A-D and an integration tester 119A-D for running automated tests on artifacts (e.g., tangible by-products produced during software development). Unit tester 117A-D may test that the individual functions in the source code 113 or executable code 135 work properly and generate unit test log 137 that contains output(s) describing progress and results of the unit tester 117A-D. Integration tester 119A-D may test the executable code 135 in an environment in which the executable code 135 is expected to be executed by users. Build tool 110A-D may include continuous integration build tool 121A-D for performing continuous build operations (e.g., performing a build at periodic intervals or in response to user requests), and presenting information about the status of executing builds and the results of completed builds. Continuous integration build tool 121A-D may start a build, e.g., by executing compiler 115A-D, unit tester 117A-D, and integration tester 119A-D in accordance with a build configuration script that contains instructions for compiling the source code and testing the resulting executable code 135. Continuous integration build tool 121A-D may monitor build output 131A-D and display progress information, such as the stage of the build (e.g., compiling, unit testing, or integration testing), the status of an executing build (e.g., how many files have been compiled, how many tests have passed, and how many tests have failed). Continuous integration build tool 121A-D may detect the completion of a build by receiving a result value from compiler 115A-D, unit tester 117A-D, and integration tester 119A-D, or by detecting particular text in the build output logs, for example. Continuous integration build tool 121A-D may generate an integration test log 139 containing information describing the progress of the operations performed by the continuous integration build tool 121A-D.

Integration tester 119A-D may create virtual resource cluster 107 for the integration testing of the artifacts. The virtual resources in cluster 107 may be containers, virtual machines, container(s) within a virtual machine, and/or virtual machine(s) running within a container. A container may refer to an isolated set of resources allocated to executing an application and/or process independent from other applications and/or processes. A virtual machine may be an emulated computer system, created using software, which includes its own operating system (referred to as a guest operating system) and executes application programs. A host machine may host one or more virtual resources for virtualizing one or more application servers for executing the artifacts for the application for the integration testing.

In one example, the host machine for virtual resource cluster 107 may be the same computing machine that hosts build server 101A-C and/or client 111. In another example, virtual resource cluster 107 may include one or more other computing machines not shown by FIG. 1. The computing machines may be server computer systems, desktop computers or any other computing devices.

A host machine may allocate a certain set of its computing resources (e.g., processor resources (CPU resources), physical or virtual memory, input/output (I/O) resources, network resources, etc.) to individual virtual resources (e.g., a virtual machine, container), and may multiplex the underlying hardware platform (e.g., infrastructure) of the host machine among the virtual resources on the host machine. For a virtual machine, the layer providing the virtualization is commonly referred to as a hypervisor and is also known as a virtual machine monitor (VMM), a kernel-based hypervisor, or part of a host operating system. The hypervisor may emulate the underlying hardware (e.g., infrastructure) of the host machine, making use of the virtual machine. Accordingly, each build tool 110A-D (or build server 101A-C and/or client 111) may be allotted a different set of computing resources. By way of illustrative example only, build tool 110A may be allotted two 2.4 megahertz (MHz) processors, and 2 gigabytes (GB) of RAM memory, build tool 110B may be allotted four 3.2 MHz processors and 16 GB of RAM memory, etc.

An application being deployed in the container may run under the host operating system. The host machine for the container may include a container engine to create and manage the containers. In one implementation, a container may run on a virtual machine to provide an extra layer of separation between applications running on a guest operating system of the virtual machine. In one implementation a virtual machine may run on a container to maintain isolation and security properties of virtual machines while being able to package and distribute computer programs as a container.

Integration tester 119A-D may run the executable code 135 in virtual resource cluster 107, and run integration tests against the distributed system being provided by virtual resource cluster 107. After build tool 110A-D compiles the source code 113 and runs unit tests and integration tests, build tool 110A-D may report whether the attempt to provide the build was a success or includes a failure. A failure may be caused by the compiling of the source code failing, unit testing failing, and/or integration testing failing.

Continuous integration build tool user interface 125 may enable a user to start one or more active build jobs. Continuous integration build tool user interface 125 presents an active build list, a build queue list, and a jobs list. The jobs list includes one or more job representations, which are user-interface representations of jobs that build tool 110A-D can execute to perform builds. Instructions can be provided to build tools 110A-D in the form of build files, such as build scripts or declarative descriptions of the files to be built in terms of files from which they are built. A job can be executed by build tool 110A-D. A job can include a set of stages, which may be executed sequentially. The stages can include, for example, compile, test, and deploy stages. The compile stage may translate source code to executable code, the test stage may perform tests to verify that the executable code operates correctly, and the deploy stage may install the executable code on host machines or nodes.

Figure 2:
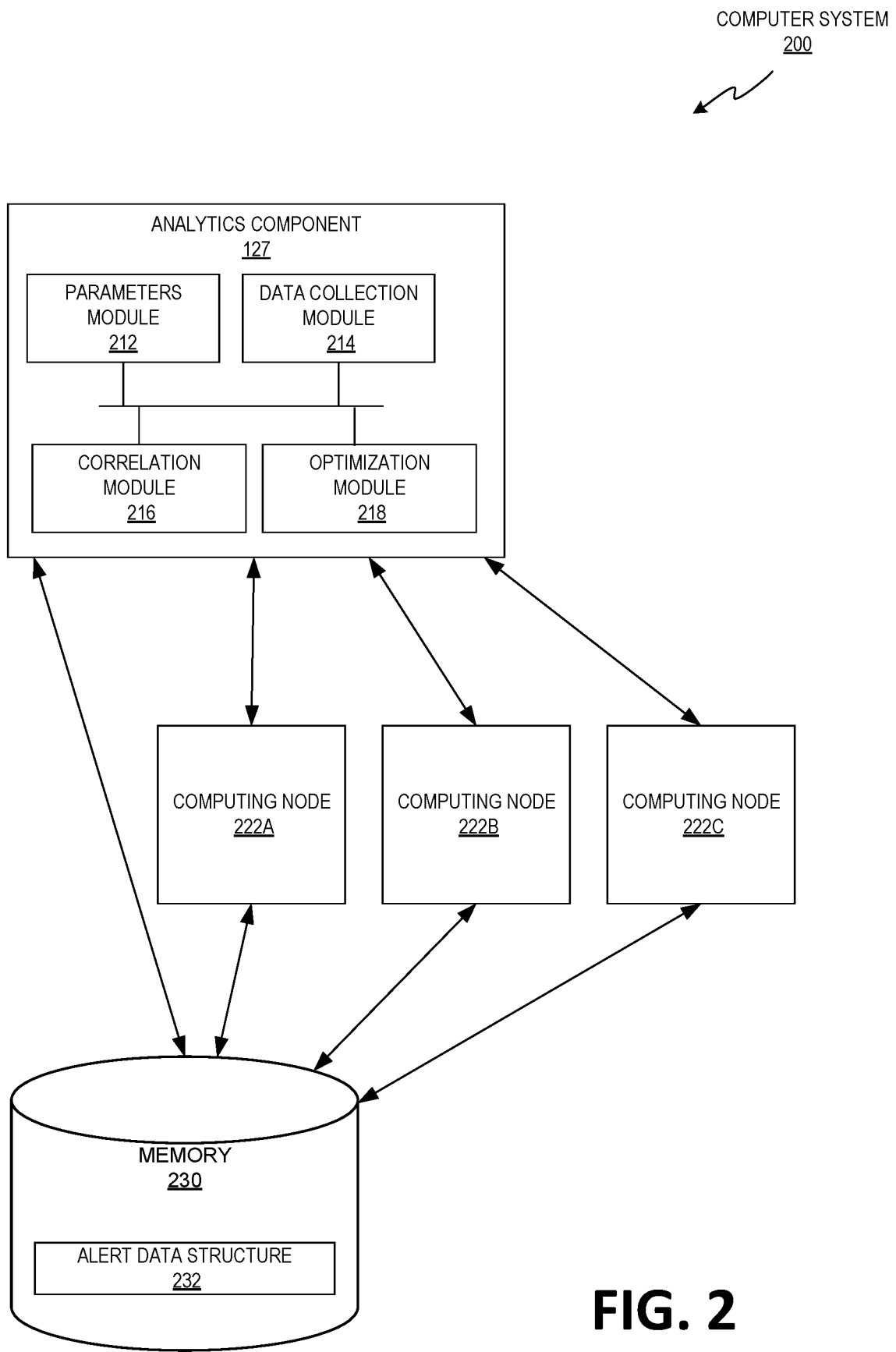
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. In the example shown, computer system 200 may include analytics component 127, computing nodes 222A-222C, and memory 230. Analytics component 127 may run executable code that implements one or more of the components and modules and may be implemented within a host operating system, a hypervisor, a guest operating system, a container, hardware firmware, or a combination thereof. Analytics component 127 may include parameters module 212, data collection module 214, correlation module 216, and optimization module 218. Computing node 222A-C may be a virtualized or bare metal computing device such as a server computer, a desktop computer, a portable computing device, etc. Memory 230 may include alert data structure 232 and conditions data structure 234.

Parameters module 212 may enable a client (e.g., client 111) to select which execution environment parameters to use for data collection operations. In some embodiments, the execution environment parameters may include one or more observable parameters and/or one or more target parameters. The observable parameter may reflect any observable aspect of the state of the execution environment. The target parameter may reflect any aspect of the execution environment performance. In some embodiments, the execution environment parameter may include job definition properties, job execution information, job artifacts, computing node properties, etc. The job definition properties may specify the number of stages in a job (e.g., the number of states in the pipeline), a type of a job, host data associated with the job, the type of access permission the job is granted, etc. The job execution information may specify how long the job waited in the queue before being executed on the computing node, duration of executing the job, results of the execution, such as whether the job executed successfully or failed, etc. The job artifacts may specify whether the job published test data, how much time did the performing the test consume, the type of log archived by the computing node, etc. The computing node properties may specify the computing nodes in pool of available computing nodes (e.g., the computing resources of each computing node, the names of each computing node, the Internet Protocol (IP) and/or Media Access Control (MAC) addresses for each computing node, etc.), which job was executed on which computing node, which entity is responsive for which computing node, etc.

The execution environment parameters may be selected via input from the client. In some embodiments, parameters module 212 may provide the client with a list of parameters that can be selected for data collection. In particular, parameters module 212 may display, on the client via a graphical user interface (GUI), a predetermined listing of available observable parameters and/or target parameters for selection. For example, parameters module 212 may display a list of observable parameter (e.g., CPU specification, memory specifications, network bandwidth, number of stages in a job, etc.) and a list of target parameters (e.g., execution time duration, queue wait time duration, etc.).

In some embodiments, parameters module 212 may further enable the client to select data collection parameters. Collection parameters may specify computing nodes (e.g., computing node 222A-222C) to be included in the data collection operations, the duration of the data collection operations, etc. The duration of the collection operations may be selected based on how many jobs are processed on the computing node(s), a time duration (e.g., a twenty-four hour period) during which the data collection operations are to be performed, etc. For example, user input may select computing nodes 222A and 222B for the data collection operations, where the data collection operations for the selected computing nodes are to be performed for fifty jobs on each node.

Data collection module 214 may retrieve parameter data related to the execution environment parameters (e.g., observable parameter(s) and/or the target parameter(s)). In some embodiments, data collection module 214 retrieve the parameter data from one or more logs, retrieving metadata related to the execution environment parameters, tracking data during the execution of a job, generating data based on the results of the job execution, etc. The collected data may be stored on memory 230. In one embodiment, data collection module 214 may read one or more logs generated by build tool 110 to retrieve the progress data. For example, build tool 110 may generate a pipeline log describing the progress of the operations performed by build tool 110. The pipeline log may include data from the compiler log, the build output log, the unit test log, the integration test log, task failures, diagnostics data, etc. The pipeline log may be generated in a file format, such as, for example, JSON (JavaScript Object Notation), XML (Extensible Markup Language), and so forth. Collection module 214 may retrieve and/or receive the pipeline log and extract progress data from the pipeline log.

In another embodiment, data collection module 214 may track the executing job and generate progress data. For example, data collection module 214 may communicate with build tool 110 to retrieve and/or receive progress data. The progress data may specify the stage of the pipeline (e.g., the compile stage, the test stage, the deploy stage, etc.) that is executing, the duration of the execution of the pipeline stage, whether a programming error (e.g., syntax error, logic error, compilation error, runtime error) occurred, and so forth. In some embodiments, data collection module 214 may communicate with build tool 110 via a program capable of handling periodic requests for data, such as a daemon.

In another embodiment, data collection module 214 may listen to network traffic generated by build tool 110 to obtain the progress data. For example, data collection module 214 may capture data packets transmitted or received by build tool 110 using, for example, a packet sniffer, a filter, etc.

Correlation module 216 may generate correlation data and display the correlation data. The correlation data may indicate a set of numeric values, such that each numeric value reflects a relationship between the observable parameter(s) and the target parameter(s). In some embodiments, the correlation data may specify a direct relationship between the observable parameter and the target parameter. For example, the observable parameter may include a computing resource of the computing nodes of the execution environment (e.g., CPU specifications of the computing nodes, RAM specifications of the computing nodes, network bandwidth of the computing nodes, etc.) and the target parameter may include the execution time of jobs processed on the computing nodes. Accordingly, the correlation module 216 may generate correlation data including the selected computing resource for each selected node, and the execution time of each job executed on the corresponding computing node. In some embodiments, each execution time may be listed individually for each computing node. In other embodiments, an average of the execution times for each computing node may be generated and displayed.

In some embodiments, correlation module 216 may use one or more correlation techniques to determine or display the correlation between one or more observable parameters and one or more target parameters. The correlation techniques may include a correlation matrix, a scatter plot, a correlation algorithm (e.g., k-means clustering, Lasso Regression, etc.), a principal component analysis, or any other technique capable of determining a correlation between sets of data. In some embodiments, correlation module 216 may use modifiers to adjust the correlation data. For example, the modifiers may include weights, Pearson coefficient, etc.

In an illustrative example, it may be desirable to determine the effects that the CPU specifications of a computing node, the RAM specifications of a computing node, and the number of stages in a job have on the execution duration of the job. To determine how the target parameter (execution time) correlates to the three observable parameters (CPU specifications, RAM specification, and number of job stages), correlation module 216 may use k-means clustering to separate output data into different clusters. K-means clustering is a method of vector quantization which partitions n observations into k clusters in which each observation belongs to the cluster with the nearest mean, serving as a prototype of the cluster. Correlation module 216 may generate a number of clusters based observable parameters and the target parameter. For example, correlation module 216 may generate three clusters based of execution time (e.g., execution time of five minutes to fifteen minutes, execution time of fifteen minutes to one hour, and execution time of more than one hour). Each cluster may indicate the observable parameters correlated with the execution times. For example, correlation module 216 may determine that for an execution time of five minutes to fifteen minutes, jobs included one stage and required less than ten gigabytes of RAM and less than five CPUs. For an execution time of fifteen minutes to one hour, jobs included three stages and required between ten gigabytes of RAM to fifty gigabytes of RAM and five CPUs to 100 CPUs. For an execution time greater than one hour, jobs included ten stages and required between more than fifty gigabytes of RAM and at least 100 CPUs.

Correlation module 216 may display the correlation data via the GUI of the client. In some embodiment, correlation module 216 may further generate and display an alert. The alert may include data indicative of one or more execution environment parameters, other than the observable parameter(s) and target parameter(s) that may affect the correlation data. For example, the observable parameter may include the CPU specification of multiple computing nodes and the target parameter may include the execution times of the job executed on the computing nodes. The correlation data may be reflective of each computing node's CPU specifications, and indicate the execution times for each job executed on each computing node. The alert may indicate that, in addition to the CPU specifications, other factors may affect the execution times of jobs on each node, such as, for example, the RAM specifications of each computing node, the number of pipeline stages in each job, etc. In some embodiments, the alerts may be determined based on the selected observable parameter(s) and/or target parameter(s). In particular, the alerts may be stored in a warnings data structure 232. Alert data structure 232 may be any type of database, table, etc., that includes a listing of one or more observable parameters and/or target parameters correlated to particular alert. If the observable parameters and/or target parameters of a listing in the alert data structure 232 are selected for data collection operations, correlation module 216 may display the associated alert along with any generated correlation data.

Optimization module 218 may perform an optimization(s) of the execution environment in view of the correlation data. In some aspects, optimizing the execution environment may decrease the queue wait time for processing a job, decrease the execution time of a job by selecting a particular computing node to execute the job, etc. In other aspects, the optimization may combines job, decrease the stages of a job, decrease the amount of code necessary to process a job, etc. An optimization may include setting a condition (e.g., conditional statements, conditional expressions, conditional constructs, etc.) in the execution environment, adjusting one or more parameters of the execution environment, etc. The optimizations may be generated using user input. In an example, based on the correlation data, it may be desirable to restrict certain computing node to specific types of job to optimize job throughput. As such, user input may set a condition that computing nodes with at least fifty gigabytes of RAM and at least 100 CPUs may be restricted to execute job with at least five stages. Accordingly, if a next available job in a build queue (a pool of jobs stored in a first-in, first-out order and awaiting a free computing node for execution) on include three stages, and the next available computing node includes sixty gigabytes of RAM and 120 CPUs, optimization module 218 may postpone execution of the particular job and may move down the build queue until a suitable job for the particular computing node is identified.

Figure 3:
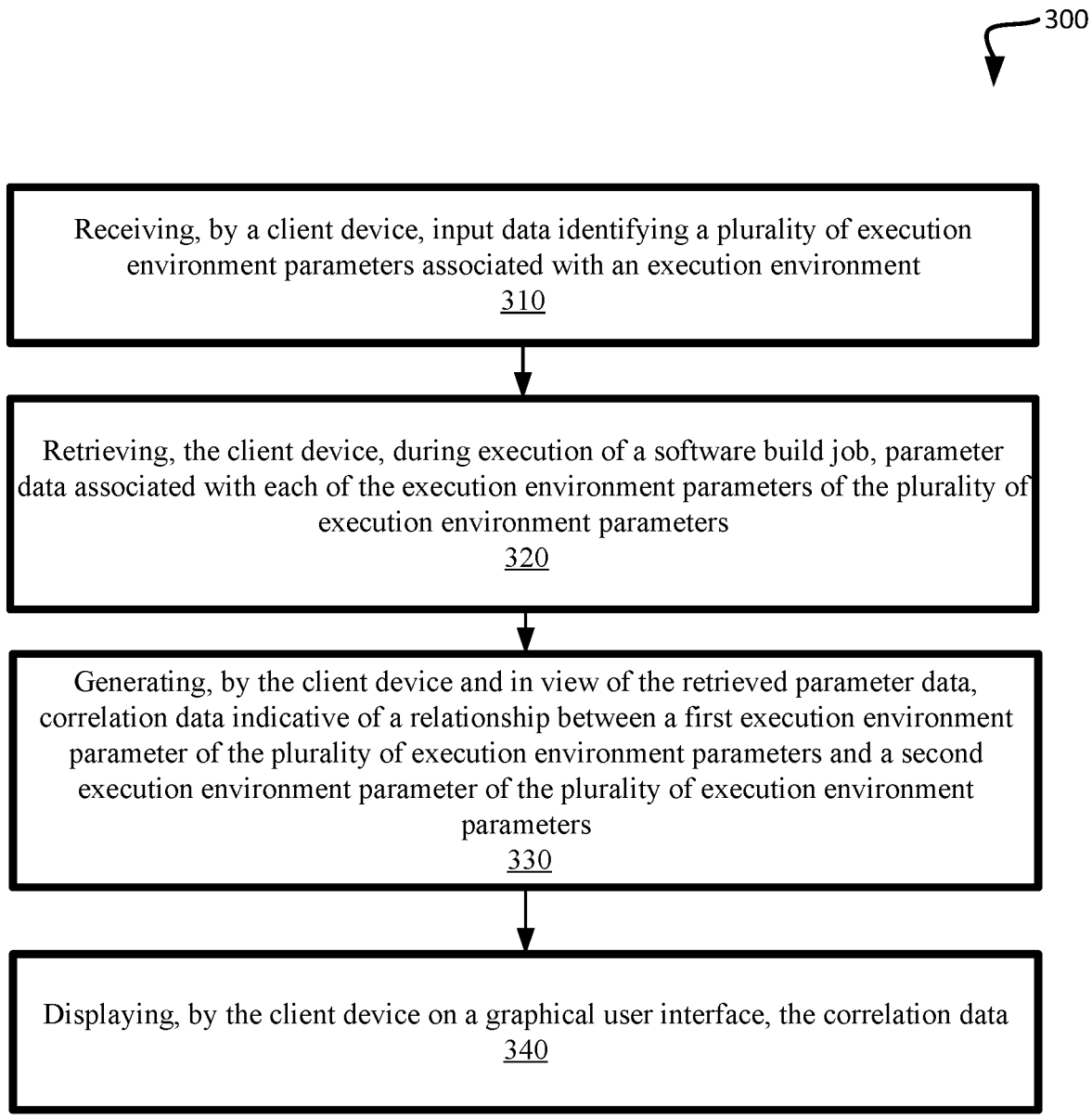
FIG. 3 depicts a flow diagram of an example method for performing data correlation, in accordance with one or more aspects of the present disclosure.

FIG. 3 depicts a flow diagram of an example method 300 for performing data correlation, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 310. At block 310, the client device may receive input data identifying a plurality of execution environment parameters associated with an execution environment. In some embodiments, an execution environment parameter may reflect at least one of a job definition property, job execution information, a job artifact, or a computing node property. In some embodiments, the client device may also receive further input data identifying one or more computing nodes from which to retrieve the parameter data. In some embodiments, the client device may also receive further input data identifying a duration during which to retrieve the parameter data.

At operation 320, the client device may retrieve, during execution of a software build job, parameter data associated with each of the execution environment parameters of the plurality of execution environment parameters.

At operation 330, the client device may generate, in view of the retrieved parameter data, correlation data indicative of a relationship between a first execution environment parameter of the plurality of execution environment parameters and a second execution environment parameter of the plurality of execution environment parameters. The first execution environment parameter may reflect an observable aspect of a state of the execution environment. For example, the first execution environment parameter may be an observable parameter. The second execution environment parameter may reflect an aspect associated with a performance of the execution environment. For example, the second execution environment parameter may be a target parameter. In some embodiments, generating the correlation data may include determining a relationship between the first execution environment parameter and the second execution environment parameter using at least one of a correlation matrix, a scatter plot, k-means clustering, Lasso Regression, or principal component analysis.

At operation 340, the client device may display, on a graphical user interface, the correlation data. In some embodiments, the client device may generate an alert indicative of a third execution environment parameter that affects the relationship between the first execution environment parameter and the second execution environment parameter. In some embodiments, the client device may optimize the execution environment in view of the correlation data by preventing a computing node from executing a job in view of the number of stage in the job or a hardware specification of the computing node. Responsive to completing the operations described herein above with references to block 340, the method may terminate.

Figure 4:
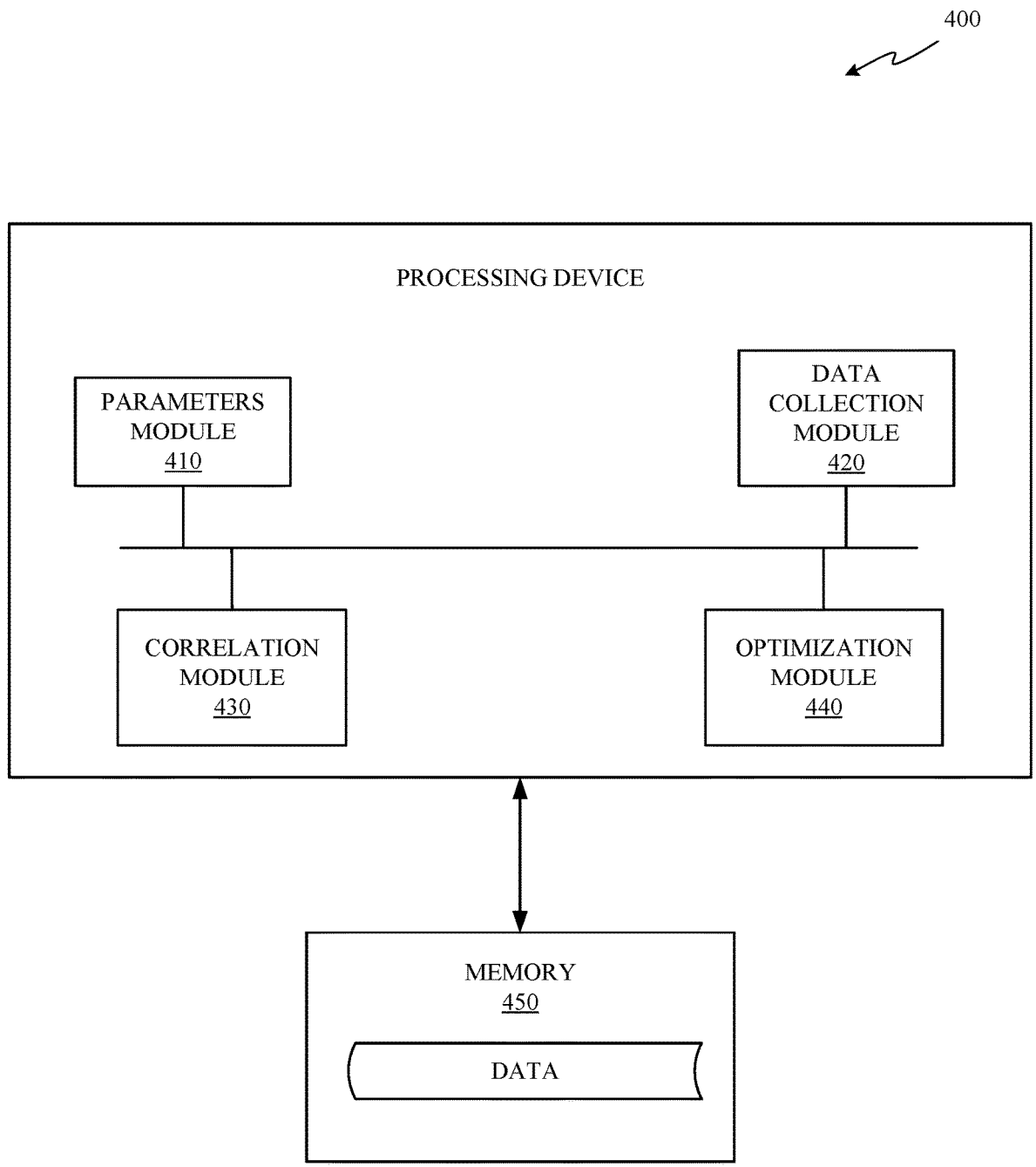
FIG. 4 depicts a block diagram of a computer system operating in accordance with one or more aspects of the present disclosure.

FIG. 4 depicts a block diagram of a computer system 400 operating in accordance with one or more aspects of the present disclosure. One or more of the components of FIG. 1 may execute on computer system 400. Computer system 400 may be the same or similar to client 111 or build server 101A-D of FIG. 1, and may include one or more processors and one or more memory devices. In the example shown, computer system 400 may include parameters module 410, data collection module 420, correlation module 430, optimization module 440, and memory 450.

Parameters module 410 may receive input data identifying a plurality of execution environment parameters associated with an execution environment. In some embodiments, an execution environment parameter may reflect at least one of a job definition property, job execution information, a job artifact, or a computing node property. In some embodiments, parameters module 410 may also receive further input data identifying one or more computing nodes from which to retrieve the parameter data. In some embodiments, parameters module 410 may also receive further input data identifying a duration during which to retrieve the parameter data.

Data collection module 420 may retrieve, during execution of a software build job, parameter data associated with each of the execution environment parameters of the plurality of execution environment parameters.

Correlation module 430 may generate, in view of the retrieved parameter data, correlation data indicative of a relationship between a first execution environment parameter of the plurality of execution environment parameters and a second execution environment parameter of the plurality of execution environment parameters. The first execution environment parameter may reflect an observable aspect of a state of the execution environment. For example, the first execution environment parameter may be an observable parameter. The second execution environment parameter may reflect an aspect associated with a performance of the execution environment. For example, the second execution environment parameter may be a target parameter. In some embodiments, generating the correlation data may include determining a relationship between the first execution environment parameter and the second execution environment parameter using at least one of a correlation matrix, a scatter plot, k-means clustering, Lasso Regression, or principal component analysis.

Correlation module 430 may further display, on a graphical user interface, the correlation data. In some embodiments, correlation module 430 may generate an alert indicative of a third execution environment parameter that affects the relationship between the first execution environment parameter and the second execution environment parameter.

Optimization module 440 may optimize the execution environment in view of the correlation data by preventing a computing node from executing a job in view of the number of stage in the job or a hardware specification of the computing node.

FIG. 5 depicts a flow diagram of one illustrative example of a method 500 for performing data correlation, in accordance with one or more aspects of the present disclosure. Method 500 may be similar to method 300 and may be performed in the same or a similar manner as described above in regards to method 500. Method 500 may be performed by processing devices of a server device or a client device and may begin at block 510.

At block 510, a processing device may receive input data identifying a plurality of execution environment parameters associated with an execution environment. In some embodiments, an execution environment parameter may reflect at least one of a job definition property, job execution information, a job artifact, or a computing node property. In some embodiments, the client device may also receive further input data identifying one or more computing nodes from which to retrieve the parameter data. In some embodiments, the client device may also receive further input data identifying a duration during which to retrieve the parameter data At operation 520, the processing device may retrieve, during execution of a software build job, parameter data associated with each of the execution environment parameters of the plurality of execution environment parameters.

At operation 530, the processing device may generate, in view of the retrieved parameter data, correlation data indicative of a relationship between a first execution environment parameter of the plurality of execution environment parameters and a second execution environment parameter of the plurality of execution environment parameters. The first execution environment parameter may reflect an observable aspect of a state of the execution environment. For example, the first execution environment parameter may be an observable parameter. The second execution environment parameter may reflect an aspect associated with a performance of the execution environment. For example, the second execution environment parameter may be a target parameter. In some embodiments, generating the correlation data may include determining a relationship between the first execution environment parameter and the second execution environment parameter using at least one of a correlation matrix, a scatter plot, k-means clustering, Lasso Regression, or principal component analysis.

At operation 540, the processing device may, display, on a graphical user interface, the correlation data. In some embodiments, the processing device may generate an alert indicative of a third execution environment parameter that affects the relationship between the first execution environment parameter and the second execution environment parameter. In some embodiments, the processing device may optimize the execution environment in view of the correlation data by preventing a computing node from executing a job in view of the number of stage in the job or a hardware specification of the computing node. Responsive to completing the operations described herein above with references to block 540, the method may terminate.

Figure 6:
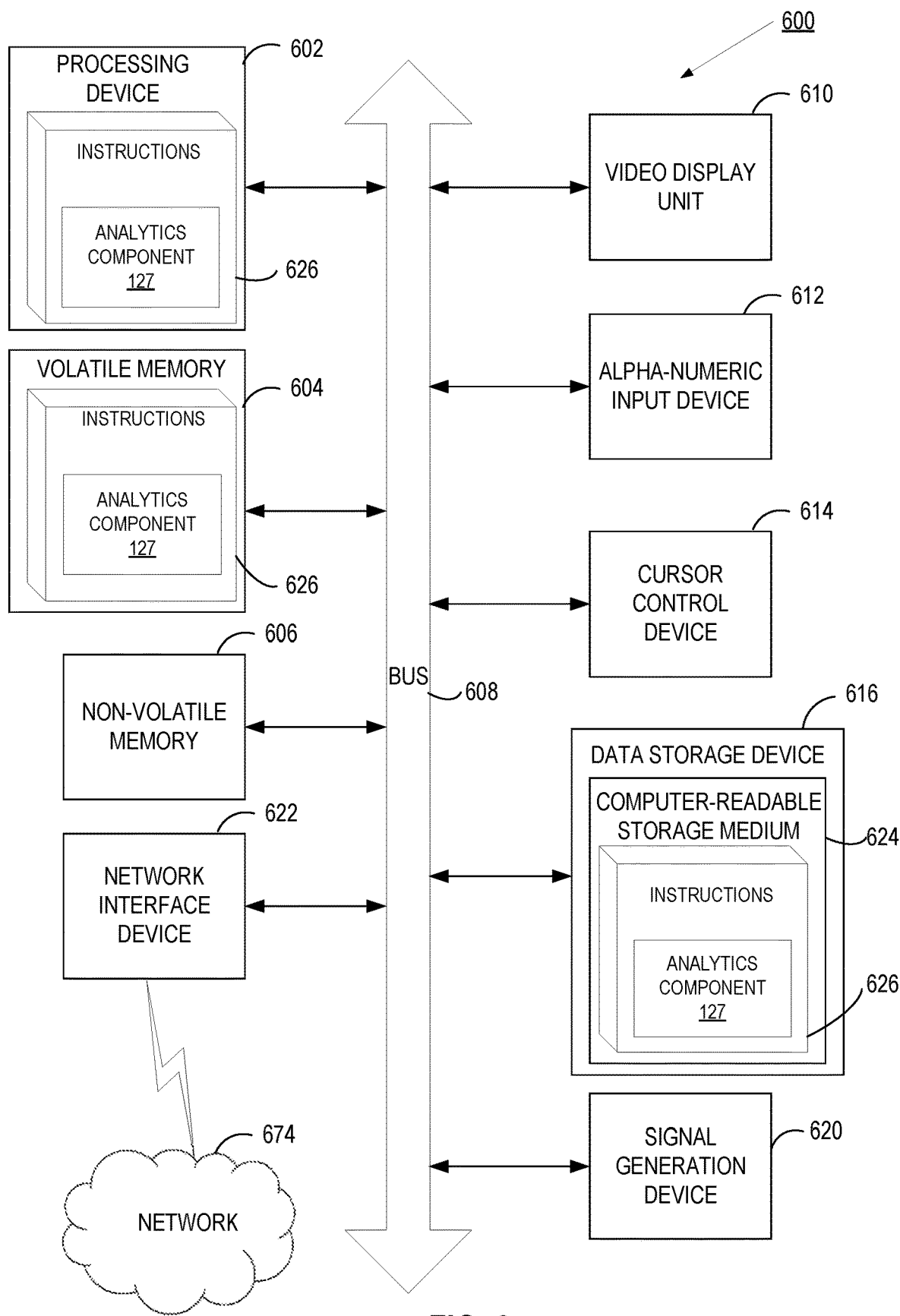
FIG. 6 depicts a block diagram of an example computer system operating in accordance with one or more aspects of the present disclosure.

FIG. 6 depicts a block diagram of a computer system operating in accordance with one or more aspects of the present disclosure. In various illustrative examples, computer system 600 may correspond to computing environment 100 of FIG. 1. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 and 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating,"

"using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 600 and/or each of its individual functions, routines, subroutines, or operations. Examples of parameter data the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processor of a client device, input data identifying a plurality of execution environment parameters associated with an execution environment;
   retrieving, during execution of a software build job, parameter data associated with each of the execution environment parameters of the plurality of execution environment parameters;
   generating, in view of the retrieved parameter data, correlation data indicative of a relationship between a first execution environment parameter of the plurality of execution environment parameters and a second execution environment parameter of the plurality of execution environment parameters, wherein the first execution environment parameter reflects an observable aspect of a state of the execution environment, and the second execution environment parameter reflects an aspect associated with a performance of the execution environment; and
   displaying, on a graphical user interface of the client device, the correlation data.

2. The method of claim 1, further comprising:
   optimizing the execution environment in view of the correlation data by preventing a computing node from executing a job in view of at least one of: a number of stages in the job or a hardware specification of the computing node.

3. The method of claim 1, wherein the execution environment parameter comprises at least one of a job definition property, job execution information, a job artifact, or a computing node property.

4. The method of claim 1, further comprising:
   receiving, by the processor of the client device, further input data identifying one or more computing nodes from which to retrieve the parameter data.

5. The method of claim 1, further comprising:
   receiving, by the processor of the client device, further input data identifying a duration during which to retrieve the parameter data.

6. The method of claim 1, wherein generating the correlation data comprises determining a relationship between the first execution environment parameter and the second execution environment parameter using at least one of a correlation matrix, a scatter plot, k-means clustering, Lasso Regression, or principal component analysis.

7. The method of claim 1, further comprising:
   generating an alert indicative of a third execution environment parameter that affects the relationship between the first execution environment parameter and the second execution environment parameter.

8. A system comprising:
   a memory;
   a processing device operatively coupled to the memory, the processing device configured to:
   receive input data identifying a plurality of execution environment parameters associated with an execution environment;
   retrieve, during execution of a software build job, parameter data associated with each of the execution environment parameters of the plurality of execution environment parameters;
   generate, in view of the retrieved parameter data, correlation data indicative of a relationship between a first execution environment parameter of the plurality of execution environment parameters and a second execution environment parameter of the plurality of execution environment parameters, wherein the first execution environment parameter reflects an observable aspect of a state of the execution environment, and the second execution environment parameter reflects an aspect associated with a performance of the execution environment; and
   display, on a graphical user interface, the correlation data.

9. The system of claim 8, wherein the processing device is further configured to:
   optimize the execution environment in view of the correlation data by preventing a computing node from executing a job in view of at least one of: a number of stages in the job or a hardware specification of the computing node.

10. The system of claim 8, wherein the execution environment parameter comprises at least one of a job definition property, job execution information, a job artifact, or a computing node property.

11. The system of claim 8, wherein the processing device is further configured to:
    receive further input data identifying one or more computing nodes from which to retrieve the parameter data.

12. The system of claim 8, wherein the processing device is further configured to:
    receive further input data identifying a duration during which to retrieve the parameter data.

13. The system of claim 8, wherein generating the correlation data comprises determining a relationship between the first execution environment parameter and the second execution environment parameter using at least one of a correlation matrix, a scatter plot, k-means clustering, Lasso Regression, or principal component analysis.

14. The system of claim 8, wherein the processing device is further configured to:
generate an alert indicative of a third execution environment parameter that affects the relationship between the first execution environment parameter and the second execution environment parameter.

15. A non-transitory machine-readable storage medium storing executable instructions that, when executed by a processing device, cause the processing device to:
receive input data identifying a plurality of execution environment parameters associated with an execution environment;
retrieve, during execution of a software build job, parameter data associated with each of the execution environment parameters of the plurality of execution environment parameters;
generate, in view of the retrieved parameter data, correlation data indicative of a relationship between a first execution environment parameter of the plurality of execution environment parameters and a second execution environment parameter of the plurality of execution environment parameters, wherein the first execution environment parameter reflects an observable aspect of a state of the execution environment, and the second execution environment parameter reflects an aspect associated with a performance of the execution environment; and
display, on a graphical user interface, the correlation data.

16. The non-transitory machine-readable storage medium of claim 15, further comprising executable instructions that, when executed by the processing device, cause the processing device to:
optimize the execution environment in view of the correlation data by preventing a computing node from executing a job in view of at least one of: a number of stages in the job or a hardware specification of the computing node.

17. The non-transitory machine-readable storage medium of claim 15, wherein the execution environment parameter comprises at least one of a job definition property, job execution information, a job artifact, or a computing node property.

18. The non-transitory machine-readable storage medium of claim 15, further comprising executable instructions that, when executed by the processing device, cause the processing device to:
receive further input data identifying one or more computing nodes from which to retrieve the parameter data.

19. The non-transitory machine-readable storage medium of claim 15, further comprising executable instructions that, when executed by the processing device, cause the processing device to:
receive further input data identifying a duration during which to retrieve the parameter data.

20. The non-transitory machine-readable storage medium of claim 15, wherein generating the correlation data comprises determining a relationship between the first execution environment parameter and the second execution environment parameter using at least one of a correlation matrix, a scatter plot, k-means clustering, Lasso Regression, or principal component analysis.

* * * * *